July 8, 1924. 1,500,531

M. C. SCHWEINERT ET AL

QUICK ACTING PUMP COUPLING

Filed May 20, 1921

Inventors:
Maximilian Charles Schweinert and
Henry Phillip Kraft,
By their Attorneys,
Fraser Twist & Myers Patented July 8, 1924.

1,500,531

UNITED STATES PATENT OFFICE.

MAXIMILIAN CHARLES SCHWEINERT, OF NEW YORK, N. Y., AND HENRY PHILLIP KRAFT, OF RIDGEWOOD, NEW JERSEY.

QUICK-ACTING PUMP COUPLING.

Application filed May 20, 1921. Serial No. 471,241.

*To all whom it may concern:*

Be it known that we, MAXIMILIAN CHARLES SCHWEINERT and HENRY PHILLIP KRAFT, citizens of the United States of America, residing in the borough of Manhattan, city, county, and State of New York, and Ridgewood, in the county of Bergen and State of New Jersey, respectively, have invented certain new and useful Improvements in Quick-Acting Pump Couplings, of which the following is a specification.

This invention relates to pump couplings, and aims to provide certain improvements therein.

The present invention is particularly directed to that type of pump coupling, whereby a quick attachment and detachment of said coupling with a tire valve or the like may be made, and one wherein notwithstanding its great simplicity, provides a very secure union between the coupled parts.

According to the present invention we provide a coupling member having an enlarged body portion provided with a bore adapted to fit over a valve nipple or other threaded member. A section of this body portion adjacent its lower end is preferably cut away to admit a dog or catch member, adapted to be projected into the bore of the coupling. This dog or catch member is preferably formed with threads on its inner end face, adapted to engage the threads on the member to which it is to be coupled. To operate this dog the body of the coupling preferably carries a longitudinally movable sleeve formed on its internal face with a bevel or taper, adapted to engage the dog to move it inwardly upon the downward movement of said sleeve.

The invention also includes other features of improvement which will be hereinafter more fully set forth.

Referring to the drawings, which show one embodiment of the invention:

Figure 1:
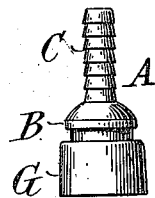
Figure 1 is a front elevation of the coupling.

Referring to the drawings, let A indicate the coupling as a whole, consisting of the body portion B of substantially cylindrical form and the usual ridged shank C for engagement with a rubber hose. The body portion B is formed with a bore D adapted to pass over the end of a valve nipple or other threaded member and is preferably unthreaded so as to slip easily over said threaded member. The body of the coupling adjacent its open end is preferably recessed as shown at E to receive a dog or catch member F, adapted to be moved into the bore D by a longitudinally movable sleeve G carried by the body portion. The recess E and the dog F are preferably of similar configurations, so that the former will act as a guide for the latter in its inward and outward movements. As herein shown, the configurations of said parts are segments of a circular ring, but it is obvious that said parts may take any other desired form without departing from the spirit of the invention. The inner end face of the dog F is preferably formed with screw threads $f$ for engaging the threads on the valve nipple, while the outer face is preferably formed with a beveled or tapered contour $f'$ adapted to coact with a cam or beveled surface $g$ on the interior of the sleeve G, which upon being moved downwardly, operates to move the dog F inwardly into the bore of the coupling. To prevent any accidental displacement or loss of the coupling parts, the sleeve G is preferably swiveled to the body portion B as shown at H, but it is obvious that any other suitable connections may be provided for accomplishing this result.

The coupling is preferably provided with a packing washer which will make a leak-tight joint with the valve nipples, and according to the present invention a washer of the plunger type is employed. As herein disclosed the packing washer I is of this type. This washer is preferably formed with a shoulder $i$ at its end adjacent the open end of the coupling, to insure a more perfect seal with the end of a valve nipple. The wall of the coupling, facing the inner end of this washer is preferably cut away as shown at K, so as to admit the inflating pressure to the back of the washer. This pressure acts to move the piston washer downwardly into intimate contact with the end of the valve nipple as shown in Fig. 2.

Figures 2, 3:
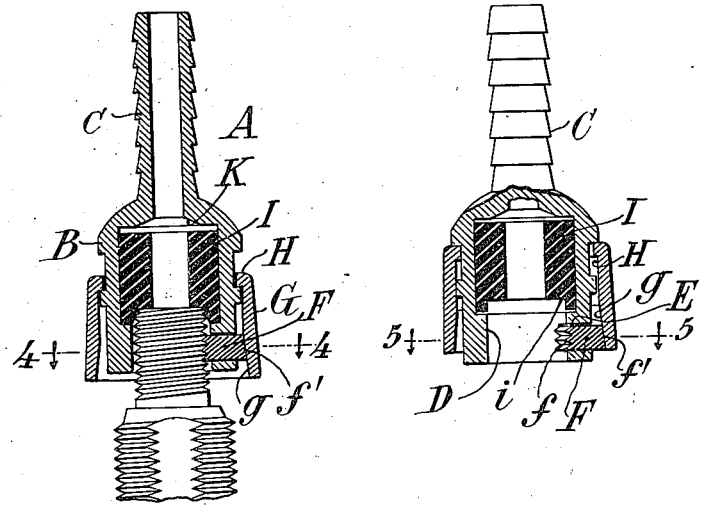
Fig. 2 is a longitudinal section thereof, showing the coupling in engagement with a valve nipple.
Fig. 3 is a partial longitudinal section, showing the dog or catch means in its retracted position.
Figure 4:
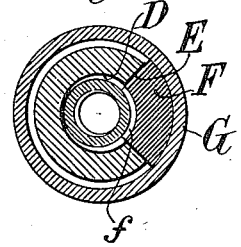
Fig. 4 is a transverse section of Fig. 2, taken on the line 4—4.
Figure 5:
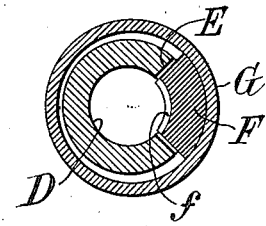
Fig. 5 is a similar section of Fig. 3, taken on the line 5—5.

To apply the pump coupling to a valve nipple or the like, the sleeve G is first drawn upwardly to its uppermost position as shown in Fig. 3 and the coupling then slipped over the valve nipple. This action will move the dog F outwardly, if it happens to be projecting within the bore of the coupling. The sleeve G is then pushed downwardly to the position shown in Fig. 2, whereupon the dog is brought into locking engagement with the threads on the nipple to securely hold the coupling thereon. To remove the coupling it is merely necessary to raise the sleeve G and lift off the coupling.

While we have shown and described but a single embodiment of our invention, it will be understood that various modifications may be resorted to without departing from the spirit of the invention. It will also be understood that the inventive idea herein disclosed is applicable to quick detachable dust caps, rim-nuts and other devices wherein a quick acting coupling means is desired.

What we claim is:—

1. A pump coupling or the like, having a body portion provided with a bore and a recess a movable part in said recess adapted to be urged into the bore to engage a threaded member to hold the coupling thereon, and a longitudinally slidable sleeve for moving said part into engaging position.

2. A pump coupling or the like, having a recessed body portion and a movable part in said recess adapted to engage a threaded member to hold the coupling thereon, and a slidable member for moving said part into engaging position, the movable part and the slidable member being provided with coacting beveled surfaces.

3. A pump coupling or the like, having a recessed body portion, a movable dog slidable in said recess in a direction at right angles to the longitudinal axis of the coupling and an actuating member longitudinally movable at substantially a right angle to the direction of movement of the dog, for moving said dog into engaging position.

4. A pump coupling or the like, having a recessed body portion, a movable dog slidable in said recess in a direction at right angles to the longitudinal axis of the coupling and an actuating member movable at substantially a right angle to the direction of movement of the dog, for moving said dog into engaging position, said dog and actuating member being formed with coacting beveled surfaces.

5. A pump coupling or the like, having a body portion provided with a bore and a recess a part movable in said recess in a direction at right angles to the longitudinal axis of the bore adapted to engage a threaded member therein to hold the coupling thereon, and a longitudinally movable sleeve carried by the coupling for moving said part into engaging position, said part and sleeve being formed with coacting surfaces.

In witness whereof, we have hereunto signed our names.

MAXIMILIAN CHARLES SCHWEINERT.
HENRY PHILLIP KRAFT.